Patented May 2, 1944

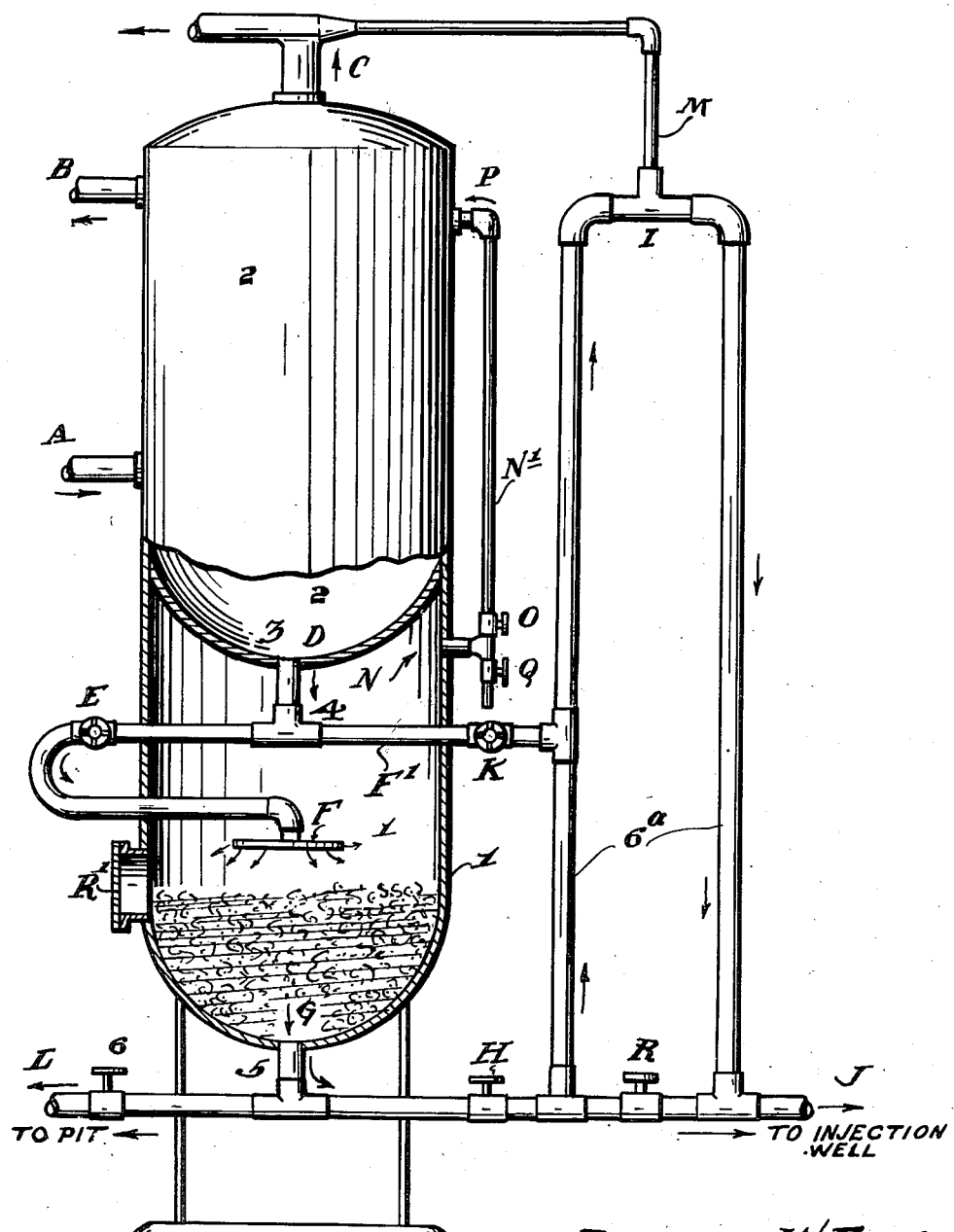

2,348,167

UNITED STATES PATENT OFFICE 2,348,167

BRINE FILTER-SKIMMER CHAMBER FOR CLOSED CRUDE OIL EMULSION TREATER TANKS

Ransome W. Erwin, Tyler, Tex.

Application June 8, 1942, Serial No. 446,192

10 Claims. (Cl. 252—328)

This invention relates to improvements in emulsion treating and water filter apparatus for use in water disposal systems in connection with oil wells in oil fields where water or brine disposal is brought about by injection of the water into disposal wells. Such a disposal system is disclosed in my patents, Nos. 2,261,057 and 2,261,100, dated Oct. 28, 1941.

In oil fields where operation of a well begins to indicate signs of water it would prove to be economical and convenient to install a combination emulsion treater and brine processing chamber. The invention is also applicable in cases where a new emulsion treater is to be installed to replace a worn out or obsolete emulsion treater system.

It is one of the objects of the present invention to provide a brine filter-skimmer chamber for incorporation in any type of closed crude oil emulsion treater or flow tank, and capable of being utilized as above.

Another object of the invention is the provision of a brine filter-skimmer chamber which may be easily inspected or changed without disturbing or having to drain the emulsion treater proper.

A further object is the provision of a filter-skimmer having an automatic arrangement for returning skimmed off oil to the treater proper, thereby saving expensive manual operation or loss of oil, usually drained off from conventional oil skimming arrangements.

Other objects and advantages of the invention will be apparent from a perusal of the following detailed description, taken in connection with the accompanying drawing, and in the drawing:

The figure is an elevational view, partly in vertical section, of the improved brine filter-skimmer, showing the same connected to a conventional type of closed emulsion treater.

In carrying out the invention there is provided a built-in brine filter-skimmer chamber indicated at 1 and located at the bottom of an emulsion treater or flow tank indicated at 2. The chamber 1 is so related and connected to the emulsion treater as to permit complete isolation, and also to permit skimmed-off oil to be automatically returned from the chamber 1 to the emulsion treater oil section 2, thereby eliminating any manual operation or troublesome accumulation of oil in the lower chamber. Between the emulsion chamber 2 and the filter-skimmer chamber 1 is a partition 3, the partition having an outlet 4 which permits by-passage or flow of water into the lower chamber 1 through a lateral pipe including an external valve E and thence by a return pipe into a spreader F within the lower chamber.

The bottom portion of the chamber 1 provides a filter section G containing porous material, such as wood excelsior, which may be changed by the use of an opening or man-hole R'. The bottom of the chamber 1 has an outlet 5 which permits water to be drained to the left through a lateral pipe controlled by a valve 6 to a pit L (not shown) or to be drained to the right to permit the water to pass through a pipe controlled by valve H to a siphon I having legs 6a, and thence in the direction of the arrow J to an injection well (not shown).

The preferred construction also includes branch outlet pipe F' leading from the T 4, and controlled by valve K, which arrangement permits water to flow directly to the siphon I, by-passing the lower chamber 1 when valve E in the pipe leading to the spreader F is closed.

In the upper part of the combined filtering and skimming chamber 1 is an outlet N which continuously floats accumulated oil from the chamber 1 up through a valve O located in a pipe $N^1$ back into the oil section at the upper portion of the treater chamber 2 at the inlet P. A valve Q permits the venting of the lower chamber 1 to the atmosphere when said chamber is shut out and is to be drained to pit through the valve 6.

A valve R located in a short pipe connecting legs 6a—6a provides a by-pass for the siphon I and a pipe M provides a gas vent equalizer for the siphon.

In the operation of the apparatus oil, emulsion and water enter the bottom portion of the treater 2, which as explained heretofore, may be of any type of closed oil treater or flow tank, at the point A. The treated oil is drawn off at the point B, and the weathered-off gases are drawn off at the point C to be handled as seen fit by the operator.

The treated-out water from the oil-emulsion mixture may be taken from any point in the bottom of the treater 2, such as shown at D, thereafter to pass to the siphon through such a valve as K, thereby by-passing the lower chamber 1. The water may alternatively pass through the valve E to the spreader F in the lower chamber 1 at a point as shown below the pipe $F^1$. Here any oil carried over is floated off at N, passing upwardly through the valve O back into the treater 2 in the upper portion of the oil section through the inlet P. The water is then filtered through a section at G, preferably containing wood excelsior. From this point the water may pass directly to the waste pit through the valve 6, but normally will pass to the right through the valve H, up and over the siphon I and out at the point J and thence to an injection well or a surge tank (not shown).

Should it be desirable to shut out the lower chamber I to change the filter, the valves E, H and O are closed and the valves K, Q and 6 are opened. Thus the water will be drained through the valve 6, being vented by the valve Q, and the treater will continue to operate, undisturbed, through the valve K, and the man-hole cover may be removed and the lower chamber I opened for inspection or filter changing. It is presumed that in this case the water coming out at J would be diverted to the pit instead of sending it unfiltered to the well, while the lower chamber is being worked on.

From the foregoing it will be apparent that the construction of the apparatus is adapted for installation in connection with any type of closed emulsion treater, and fulfills the desired qualifications. The arrangement has advantages even in connection with an emulsion treater wherein the water is not being injected, in that oil often lost in water discharged from conventional emulsion treaters would be saved by the operator, resulting both in sending clean oil to the tanks and discharging clean water from the system, whereas in most instances the cleanliness of the discharged water is completely ignored.

The disclosure may be varied and alterations made in keeping with the inventive thought and within the scope and meaning of the claims appended hereto.

What I claim is:

1. A method of treating a mixture of oil, water and emulsion which comprises roughly separating the water from the oil and emulsion in a closed treating chamber, passing said water downwardly to a filtering zone in a lower chamber separate from the initial treating chamber, to remove insoluble foreign matter, allowing any remaining oil to separate from the water in the filtering chamber, continuously withdrawing the separated oil from the filtering chamber and returning the separated oil to the initial treating chamber, and withdrawing the filtered water from which both oil and mineral impurities have been removed for passage to a brine disposal well.

2. A method of treating a mixture of oil, water and emulsion which comprises roughly separating the water from the oil and emulsion in a closed treating chamber, passing said water downwardly to a filtering zone in a lower chamber separate from the initial treating chamber, to remove insoluble foreign matter, allowing any remaining oil to separate from the water in the filtering chamber, continuously withdrawing the separated oil from the filtering chamber and returning the separated oil to the initial treating chamber, and withdrawing the filtered water from which both oil and mineral impurities have been removed for passage to a brine disposal well, said method being carried out in a closed system under superatmospheric pressure.

3. A method of treating crude oil and oil emulsion which comprises initially and continuously separating the watery and oily portions thereof in a closed chamber, passing the watery portion to a separate filtering and skimming chamber, filtering out any precipitated mineral material and insoluble foreign matter from the water, and allowing any remaining oil in the watery portion to separate out by gravity, continuously withdrawing the separated oil and returning said oil to the oil zone of said initial treating chamber and discharging the filtered water from the filtering and skimming chamber after removal of said oil and foreign matter therefrom.

4. A combined emulsion treating and water filtering apparatus comprising a closed upright tank, including an upper emulsion treating chamber for initially separating oil and water, and a lower water filtering chamber, a partition separating the two chambers, a valved conduit connecting the lower portion of the upper chamber with the upper portion of the lower chamber to allow the separated water in the emulsion treating chamber to pass to the filtering chamber, a second valved conduit leading from the lower portion of the emulsion treating chamber but by-passing the filtering chamber, whereby the water may periodically be diverted to a disposal point without interference with the operation of the upper treating chamber, while the lower chamber is being cleaned.

5. A closed pressure system for treating crude oil and emulsion, comprising an upright tank having an upper emulsion treating chamber for separating oil and water, a lower water filtering chamber separate from the emulsion treating chamber, a valved conduit connecting said chambers to permit flow by gravity of the separated water from the upper chamber to the upper part of the lower chamber, a discharge outlet for filtered water leading from the lower portion of the filtering chamber to a brine disposal well, a siphon connected to said discharge outlet to maintain a fixed liquid level in said tank, and means for by-passing said filter chamber at the will of the operator, to permit water to flow from said upper chamber to waste without passing through the filtering chamber, whereby the lower chamber may be cleaned without interfering with the operation of the upper chamber.

6. An apparatus for treating crude oil emulsion, comprising a closed upright tank including an emulsion treating chamber for initially separating oil and water, and a lower chamber for treating the water separated from the oil in the upper chamber, a partition separating the two chambers, an opening in the partition, a valved pipe leading from the opening to the interior of the lower tank having a spreader for spraying the water into said lower chamber for filtering, a discharge pipe for filtered water leading from the lower chamber to a brine disposal well, and a valved by-pass connection connected to said opening, whereby water may be periodically diverted to a disposal point without interfering with the operation of the upper chamber while the lower chamber is being cleaned.

7. A combined emulsion treating and water filtering apparatus comprising a closed upright tank including an upper emulsion treating chamber for initially separating oil and water, and a lower water treating chamber, a partition separating the two chambers, and a passage through said partition to allow the water separated from the oil in the upper chamber to flow into the lower chamber, said lower chamber having a lower filtering zone and an upper oil skimming zone, the lower zone containing porous filtering material for separating out insoluble foreign material, and the upper zone including a valved outlet passing through the side wall of the tank and connected with the upper portion of the emulsion treating chamber, whereby any oil separated from the water in the water treating chamber may be combined with the oil in said emulsion treating chamber.

8. An apparatus for use in treating crude oil waters where water disposal is effected by injection into a well or pit, comprising in combination with an upper closed emulsion treater tank, a built-in lower tank providing a chamber connected to the upper tank, a partition separating the two tanks, an opening in the partition, a siphon, and valved piped connections between the partition opening and the siphon, whereby the water may be diverted to a disposal point without interference of the upper treater tank, said lower tank comprising a chamber having a filter medium in the lower portion thereof, and the upper portion of the chamber having an outlet with valved pipe connection leading to the upper portion of the upper tank, whereby the carry-over oil may be conducted back into said upper treater tank.

9. An apparatus for treating crude oil emulsion comprising a closed upright tank having an upper emulsion treating chamber for initially separating oil and emulsion, a lower water treating chamber separate from the upper chamber, a partition between said chambers, a passage through said partition, a pipe connected with said passage discharging into the upper portion of the lower chamber, said pipe including a portion extending outside of the tank having a valve therein accessible from the exterior of the tank, and a by-pass pipe connected to said passage and adapted to be connected to a waste point having a valve therein accessible from the exterior of the tank, whereby the lower portion of the tank may be cut off by manual operation of said valves, and the water from said upper chamber discharged to waste without interfering with the continuous operation of the emulsion treating chamber.

10. An apparatus for treating crude oil emulsion comprising a closed upright tank having an upper emulsion treating chamber for initially separating oil and emulsion, a lower water treating chamber separate from the upper chamber, a partition between said chambers, a passage through said partition, a pipe connected with said passage discharging into the upper portion of the lower chamber, said pipe including a portion extending outside of the tank having a valve therein accessible from the exterior of the tank, and a by-pass pipe connected to said passage and adapted to be connected to a waste point having a valve therein accessible from the exterior of the tank, whereby the lower portion of the tank may be cut off by manual operation of said valves, and the water from said upper chamber discharged to waste without interfering with the continuous operation of the emulsion treating chamber, and siphon means for maintaining a constant liquid level in said tank.

RANSOME W. ERWIN.